United States Patent
Arik et al.

(10) Patent No.: US 12,026,614 B2
(45) Date of Patent: Jul. 2, 2024

(54) INTERPRETABLE TABULAR DATA LEARNING USING SEQUENTIAL SPARSE ATTENTION

(71) Applicant: Google LLC, Mountain View, CA (US)

(72) Inventors: Sercan Omer Arik, San Francisco, CA (US); Tomas Jon Pfister, Foster City, CA (US)

(73) Assignee: Google LLC, Mountain View, CA (US)

( * ) Notice: Subject to any disclaimer, the term of this patent is extended or adjusted under 35 U.S.C. 154(b) by 842 days.

(21) Appl. No.: 16/945,898

(22) Filed: Aug. 2, 2020

(65) Prior Publication Data
US 2021/0034977 A1    Feb. 4, 2021

Related U.S. Application Data

(60) Provisional application No. 62/881,980, filed on Aug. 2, 2019.

(51) Int. Cl.
    *G06N 3/08*     (2023.01)
    *G06N 3/04*     (2023.01)

(52) U.S. Cl.
    CPC ............... *G06N 3/08* (2013.01); *G06N 3/04* (2013.01)

(58) Field of Classification Search
    CPC ............ G06N 3/08; G06N 3/04; G06N 3/045; G06N 3/088; G06N 3/082; G06N 3/084; G06N 3/048
    See application file for complete search history.

(56) References Cited

U.S. PATENT DOCUMENTS

| | | | |
|---|---|---|---|
| 2019/0073581 A1* | 3/2019 | Chen ...................... | G06N 3/045 |
| 2019/0215551 A1 | 7/2019 | Modarresi et al. | |
| 2020/0193296 A1* | 6/2020 | Dixit ...................... | G06N 3/045 |
| 2020/0311613 A1* | 10/2020 | Ma ......................... | G06N 20/20 |

(Continued)

FOREIGN PATENT DOCUMENTS

| | | | | |
|---|---|---|---|---|
| WO | WO-2020257783 A1 * | 12/2020 | ............. | G06F 21/53 |

OTHER PUBLICATIONS

Hao et al.("PASNet: pathway-associated sparse deep neural network for prognosis prediction from high-throughput data", 2018) (Year: 2018).*

(Continued)

*Primary Examiner* — Jason B Dunham
*Assistant Examiner* — Huma Waseem
(74) *Attorney, Agent, or Firm* — Honigman LLP; Brett A. Krueger

(57) ABSTRACT

A method of interpreting tabular data includes receiving, at a deep tabular data learning network (TabNet) executing on data processing hardware, a set of features. For each of multiple sequential processing steps, the method also includes: selecting, using a sparse mask of the TabNet, a subset of relevant features of the set of features; processing using a feature transformer of the TabNet, the subset of relevant features to generate a decision step output and information for a next processing step in the multiple sequential processing steps; and providing the information to the next processing step. The method also includes determining a final decision output by aggregating the decision step outputs generated for the multiple sequential processing steps.

18 Claims, 10 Drawing Sheets

(56) References Cited

U.S. PATENT DOCUMENTS

2020/0327377 A1* 10/2020 Jaganathan ............ G16B 40/00
2021/0264271 A1* 8/2021 Gebre .................... G06N 3/045

OTHER PUBLICATIONS

Jan André Marais ("Deep Learning for Tabular Data: An Exploratory Study", Apr. 2019) (Year: 2019).*
Martins et al. (From Softmax to Sparsemax: A Sparse Model of Attention and Multi-Label Classification, Feb. 8, 2016) (Year: 2016).*
International Search Report and Written Opinion for related Application PCT/US2020/044688, 17 pages, dated Aug. 2, 2020.
Guolin Ke et al: "TABNN: A Universal Neural Network Solution for Tabular Data", Dec. 21, 2018 (Dec. 21, 2018), Retrieved from the Internet: URL:https://openreview.net/pdf?id=rleJssCqY7 [retrieved on Oct. 29, 2020] p. 3-p. 7, p. 13.
Edward Choi et al: "Retain: An Interpretable Predictive Model for Healthcare using Reverse Time Attention Mechanism", Aug. 19, 2016 (Aug. 19, 2016), Retrieved from the Internet: URL:http://papers.nips.cc/paper/6321-retain-an-interpretable-predictive-model-for-healthcare-using-reverse-time-attention-mechanism.pdf [retrieved on Oct. 29, 2020] the whole document, 9 pages.

\* cited by examiner

INTERPRETABLE TABULAR DATA LEARNING USING SEQUENTIAL SPARSE ATTENTION

CROSS REFERENCE TO RELATED APPLICATIONS

This U.S. patent application claims priority under 35 U.S.C. § 119(e) to U.S. Provisional Application 62/881,980, filed on Aug. 2, 2019 The disclosures of this prior application is considered part of the disclosure of this application and is hereby incorporated by reference in its entirety.

TECHNICAL FIELD

This disclosure relates to interpretable tabular data learning using sequential sparse attention.

BACKGROUND

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

One aspect of the disclosure provides a method of interpreting tabular data. The method includes receiving, at a deep tabular data learning network (TabNet) executing on data processing hardware, a set of features. For each of multiple sequential processing steps, the method also includes: selecting, by the data processing hardware, using a sparse mask of the TabNet, a subset of relevant features of the set of features, processing, by the data processing hardware, using a feature transformer of the TabNet, the subset of relevant features to generate a decision step output and information for a next processing step in the multiple sequential processing steps: and providing, by the data processing hardware, the information to the next processing step. The method also includes determining, by the data processing hardware, a final decision output by aggregating the decision step outputs generated for the multiple sequential processing steps.

Implementations of the disclosure may include one or more of the following optional features. In some implementations, the method also includes, for each of the multiple processing steps determining, by the data processing hardware, using an attentive transformer of the TabNet, an aggregate of how many times each feature in the set of features has been processed in each preceding processing step of the multiple sequential processing steps. In these implementations, the attentive transformer may include a fully connected layer and batch normalization.

In some examples, providing the information to the next processing step includes providing the information to an attentive transformer of the TabNet that determines, based on provided information, an aggregate of how many times each feature in the set of features has been processed in each preceding processing step of the multiple sequential processing steps. The set of features may include tabular data. Optionally, the feature transformer of the TabNet may include a plurality of neural network layers each including a fully-connected layer, batch normalization, and a generalized linear unit (GLU) nonlinearity. Here, a first portion of the plurality of neural network layers may be shared across each of the multiple sequential processing steps and a remaining second portion of the plurality of neural network layers may be dependent on a corresponding processing step of the multiple sequential processing steps.

The decision step output generated by processing the subset of relevant features may pass through a rectified linear unit (ReLU) of the TabNet. Additionally, the subset of features may correspond to interdependent feature columns of tabular data. In some implementations, the method also includes receiving, at the data processing hardware, tabular data including one or more masked features, and predicting, by the data processing hardware, the one or more masked features using unsupervised pre-training.

Another aspect of the disclosure provides a system for interpreting tabular data. The system includes data processing hardware and memory hardware in communication with the data processing hardware. The memory hardware stores instructions that when executed on the data processing hardware cause the data processing hardware to perform operations that include receiving, at a deep tabular data learning network (TabNet) executing on the data processing hardware, a set of features. For each of multiple sequential processing steps, the operations also include selecting, using a sparse mask of the TabNet, a subset of relevant features of the set of features; processing, using a feature transformer of the TabNet, the subset of relevant features to generate a decision step output and information for a next processing step in the multiple sequential processing steps, and providing the information to the next processing step. The operations also include determining a final decision output by aggregating the decision step outputs generated for the multiple sequential processing steps.

This aspect may include one or more of the following optional features. In some implementations, the operations also include, for each of the multiple processing steps determining, using an attentive transformer of the TabNet, an aggregate of how many times each feature in the set of features has been processed in each preceding processing step of the multiple sequential processing steps. In these implementations, the attentive transformer may include a fully connected layer and batch normalization.

In some examples, providing the information to the next processing step includes providing the information to an attentive transformer of the TabNet that determines, based on provided information, an aggregate of how many times each feature in the set of features has been processed in each preceding processing step of the multiple sequential processing steps. The set of features may include tabular data. Optionally, the feature transformer of the TabNet may include a plurality of neural network layers each including a fully-connected layer, batch normalization, and a generalized linear unit (GLU) nonlinearity. Here, a first portion of the plurality of neural network layers may be shared across each of the multiple sequential processing steps and a remaining second portion of the plurality of neural network layers may be dependent on a corresponding processing step of the multiple sequential processing steps.

The decision step output generated by processing the subset of relevant features may pass through a rectified linear unit (ReLU) of the TabNet. Additionally, the subset of features may correspond to interdependent feature columns of tabular data. In some implementations, the operations also include receiving tabular data including one or more masked features and predicting the one or more masked features using unsupervised pre-training.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
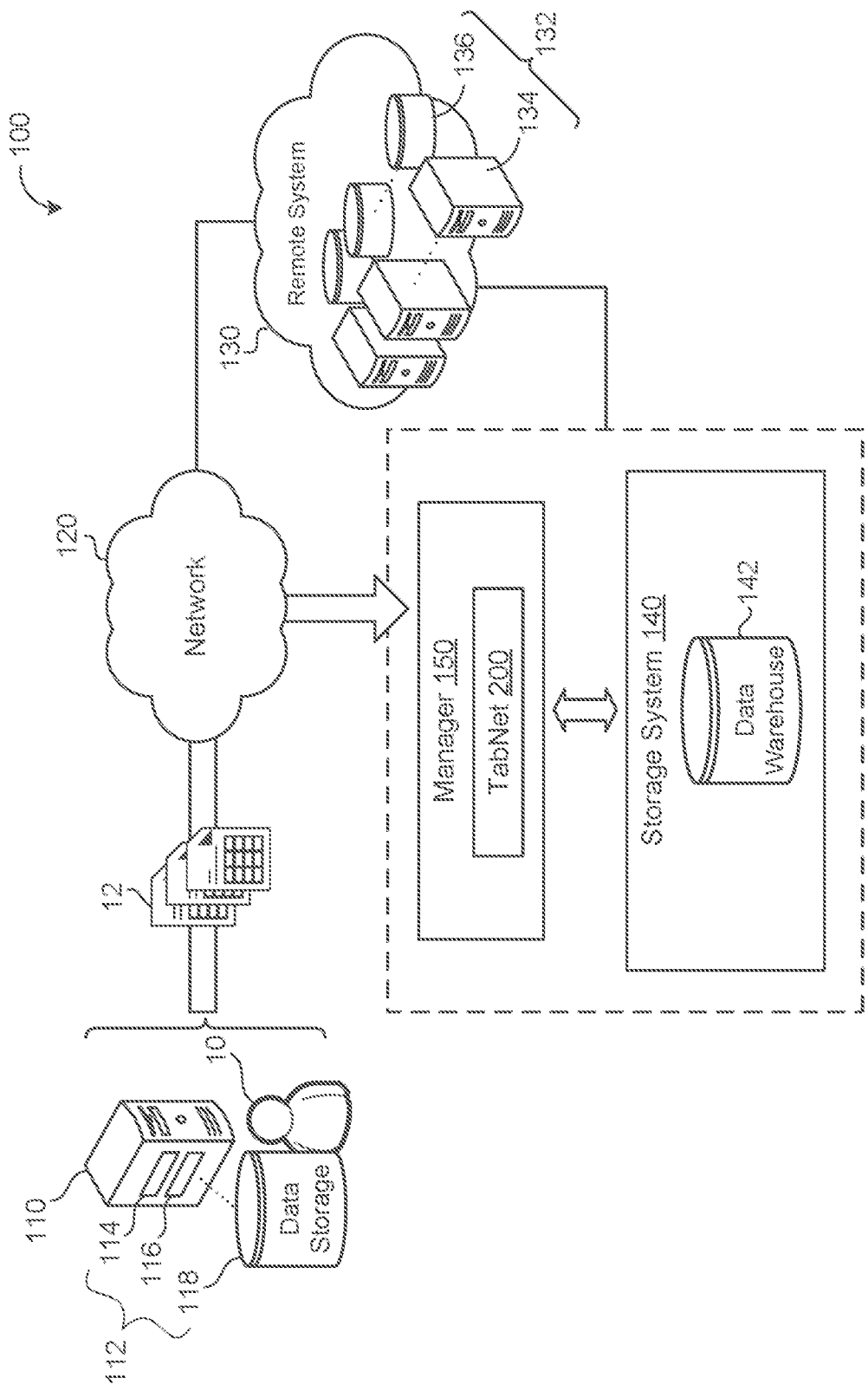
FIG. 1 is a schematic view of an example data management environment.

Neural networks have been generally successful for processing data types such as images, text, and audio. Yet one type of data that appears to be lacking behind, despite being one of the most common data types in computing, is tabular data. Tabular data refers to data that is in a table format. Often, instead of using neural networks, tabular data tends to use decision trees due to their ability to be interpretable, representationally efficient, and fast to train. For example, the interpretability of a decision tree enables someone to understand how the decision tree came to a particular result rather than simply receive the result without context. A decision tree is interpretable because decisions may be tracked via the nodes of the decision tree. In the realm of tabular data, there may be trust issues that manifest as a concern about the decision that led to a particular outcome. For example, how did a decision tree predict that an employee's bonus compensation should be some number or how did a loan processing tool predict that an applicant qualified for a particular size loan? In these scenarios, someone may want to examine the context of the decision.

Conventionally, neural networks are based on stacked layers that can cause a neural network to be over parameterized. By being over parameterized conventional neural networks tend to fail to find optimal solutions for tabular decision manifolds. Neural networks, however, if adequately adapted to tabular data, could offer similar benefits that one would expect based on their performance for other data types. For example, neural networks are particularly useful for large data sets and capable of employing back propagation into their inputs to guide efficient learning toward an objective. With a neural network designed for tabular data, the neural network may also efficiently encode multiple data types (e.g., images) in combination with tabular data, minimize the need for feature engineering, which is currently a key aspect of tree-based tabular data learning methods, enable learning from streaming data, which currently proves to be difficult for decision tree models (e.g., decision trees struggle to dynamically adapt split points), and allow representation learning for domain adaptation, generative modeling, and semi-supervised learning.

To address some of the pre-existing deficiencies of neural networks for tabular data while incorporating the general benefits of neural networks, TabNet is a neural network designed to learn in a decision tree-like manner. In other words, TabNet aims to offer interpretability and sparse feature selection. TabNet inputs raw tabular data without any feature pre-processing and is trained using gradient descent-based optimization to learn flexible representations and enable flexible integration into end-to-end learning. Moreover, TabNet uses sequential attention to choose features to interpret at each decision step: allowing it to be interpretable and focused on salient features. The feature selection can be different for each input (i.e., instant-wise) in a single deep learning architecture with end-to-end learning. With this approach, TabNet has been proven to outperform or perform as well as other tabular learning models (e.g., decision-tree models) on various data sets for classification and regression problems. As for interpretability, TabNet offers two kinds of interpretability. It allows local interpretability that visualizes the importance of input features and how their combined while also having global interpretability that quantifies the contribution of each input feature in relation to the trained model. Furthermore, for tabular data, TabNet is able to use techniques such as unsupervised pre-training to predict missing features.

Feature selection generally refers to a process of selecting a subset of features from a larger pool of features based on how useful each feature is towards a given prediction. When features are selected based on an entire training data set, this type of feature selection is referred to as a global feature selection method. In contrast, an instance-wise feature selection method refers to selecting features individually for each input. Although some methods train a model to maximize mutual information between the selected features in a given response variable, TabNet uses soft feature selection with controllable sparsity in end-to-end learning that allows a single model to jointly perform feature selection and output mapping. This soft feature selection ability is then embedded with controllable sparsity using sequential attention. Moreover, unlike some models that try to map tabular data to a different data type, TabNet is able to apply sequential attention for supervised or self-supervised learning on tabular data. TabNet is designed to have a tree-like functionality where a linear combination of features are selected with a feature selection process to represent decision boundaries. TabNet uses training data sets to learn sparse instance-wise selection, constructs a sequential multistep architecture where each decision step can contribute to a portion of the decision that is based on the selected features, performs nonlinear processing of the selected features, and mimics an ensemble via higher dimensions and more steps. With this approach, TabNet marries the benefits of a neural network with the benefits of tree-based decision models for tabular data.

FIG. 1 illustrates an example of a data management environment 100. A user device 110 associated with a user 10 generates user data 12 during execution of its computing resources 112 (e.g., data processing hardware 114 and/or memory hardware 116). For example, the user 10 uses one or more applications (e.g., real-time applications) operating on data processing hardware 114 of the user device 110 to generate the user data 12. In some examples, the user device 110 is a local device (e.g., associated with a location of the user 10) that uses its own computing resources 112 with the ability to communicate (e.g., via the network 120) with one or more remote systems 130. Additionally or alternatively, the user device 110 leverages its access to remote resources (e.g., remote computing resources 132) to operate applications for the user 10. User data 12 generated through the use of the user device 110 may be initially stored locally (e.g., such as in data storage 118 of the memory hardware 116) and then communicated to a remote system 130 or sent upon creation through a network 120 to the remote system 130. For example, the user device 110 communicates the user data to a storage system 140 using the remote system 130.

In some examples, the user 10 utilizes the computing resources 132 of the remote system 130 (e.g., a cloud computing environment) for storage and/or management of the user data 12. In these examples, the remote system 130 may receive user data 12 as it is being generated by various user applications. Here, the user data 12 may refer to a data stream (e.g., a continuous or generally continuous feed of data arriving at the remote system 130 for storage and/or further processing) or a discrete set of user data 12 sent to the remote system 130 at the coordination of the user 10. Much like the user device 110, the remote system 130 includes computing resources 132 such as remote data processing hardware 134 (e.g., server and/or CPUs) and memory hardware 136 (e.g., disks, databases, or other forms of data storage).

In some configurations, the remote computing resources 132 are resources utilized by various systems associated and/or communicating with the remote system 130. Although FIG. 1 depicts the remote system 130 in communication with a data storage system 140 and manager 150, the remote system 130 may also be in communication with other data-related systems (e.g., a query system, and/or an analytics system). The remote system 130 with its computing resources 132 may be configured to host one or more functions of manager 150 and/or data processing model 200. In some implementations, the remote system 130 is a distributed system whose computing resources 132 are distributed across one or more locations accessible via the network 120.

In some examples, the storage system 140 is configured to operate a data warehouse 142 (e.g., a data store and/or a plurality of databases) as a means of data storage for the user 10 (or multiple users). Generally speaking, a data warehouse 142 stores data from one or more sources and may be designed to analyze, report, and/or integrate data from its sources. A data warehouse 142 enables users (e.g., organizational users) to have a central storage depository and storage data access point. By containing user data 12 in a central depository such as a data warehouse 142, the data warehouse 142 may simplify data retrieval for functions such as data analysis and/or data reporting (e.g., by an analytics system). Furthermore, data warehouses 142 may be configured to store a significant amount of data such that a user 10 (e.g., an organizational user) can store large amounts of historical data to understand data trends. Being that data warehouses 142 may be the main or sole data storage depository for a user's data 12, the storage system 140 may often be receiving large amounts of data from user devices 110 associated with the user 10. Additionally or alternatively, as a storage system 140, the storage system 140 and/or storage warehouse 142 may be configured for data security (e.g., data redundancy) for multiple users from a single data source (e.g., multiple employees of an organization), and/or for simultaneous multi-user access. In some configurations, the data warehouse 142 is persistent and/or non-volatile such that data, by default, is not overwritten or erased by new incoming data.

Generally speaking, data storage systems 140 receive user data 12 in a table format referred to as tabular data where the user data 12 populates rows and columns of a table. With tabular data, the user data 12 within the table may have rows and columns that correspond to schemas or headings associated with the user data 12. For example, the user data 12 may refer to commercial transactions made by the user 10. In this example, the user data 12 may include columns for a seller, a buyer, a transaction price, a transaction quantity, and other transactional data that the user 10 gathers regarding its transactions. Here, each row may have a heading or schema, such as a transaction number or identifier and/or a time entry associated with the transaction. Since the storage system 140 may receive the user data 12 in a particular format (e.g., the transaction table format), the storage system 140 is configured to store the user data 12 such that elements of the format (e.g., relationships, headings, or other schema) associated with the user data 12 (e.g., providing further context or definition to the user data 12) are accessible to other system in communication with the data storage system 140 (e.g., data retrieval systems such as query systems or data analytics systems).

Referring further to FIG. 1, the data management environment 100 also includes a manager 150. The manager 150 is generally configured to coordinate (e.g., optimize) data storage. The manager 150 may perform this optimization by executing and/or coordinating operations related to systems in communication with the data storage system 140 using a data processing model 200 (also referred to as TabNet 200). Here, while performing data storage, TabNet 200 is configured as machine learning model that may learn aspects of tabular data received at the manager 150. Based on this learning, TabNet 200 is capable of aiding various management functions. For instance, TabNet 200 is configured to identify missing or incomplete data (referred to as a missing feature) in the user data 12 and to predict or to generate (or to suggest) a data entry for the missing data. Similarly, instead of predicting entries for incomplete data, the user 10 may request that TabNet 200 (via the manager 150) predict what an entry should be based on other data stored for the user 10. For instance, the user 10 is a company that wants to know how much it should pay a new employee based on the employee's previous experience and skills. Here, TabNet 200 would interpret employee financial user data 12 stored at the storage system 140 that, for example, included salary, job title, department, years of experience, etc., and, based on the user data 12 it interprets, output a prediction for the salary of the new employee. In some examples, the manager 150 uses TabNet 200 to interpret interdependencies of the user data 12 in order to understand how user data 12 may be stored, while still preserving the relationships between columns of the user data 12. In other words, TabNet 200 may identify split points that indicate where to divide the user data 12 for storage purposes.

In some implementations, such as FIG. 1, the manager 150 is configured to receive user data 12 from the user 10 and to facilitate storage operations at the storage system 140. For instance, the manager 150 ingests the user data 12 upon receipt and may translate the user data 12 into a storage-optimized format. Here, ingestion refers to obtaining and/or importing the user data 12 into the storage system 140 (e.g., into the data warehouse 142) to allow system(s) to use the ingested user data (e.g., by query systems and/or analytic systems). During ingestion, the manager 150 may use TabNet 200 to validate a format of the user data 12 (e.g., to comply with acceptable formats for the storage system 140) and/or to route the user data 12 to the data warehouse 142 (e.g., particular data storage locations in the data warehouse 142 designated for user data 12 of the user 10).

Figure 2A:
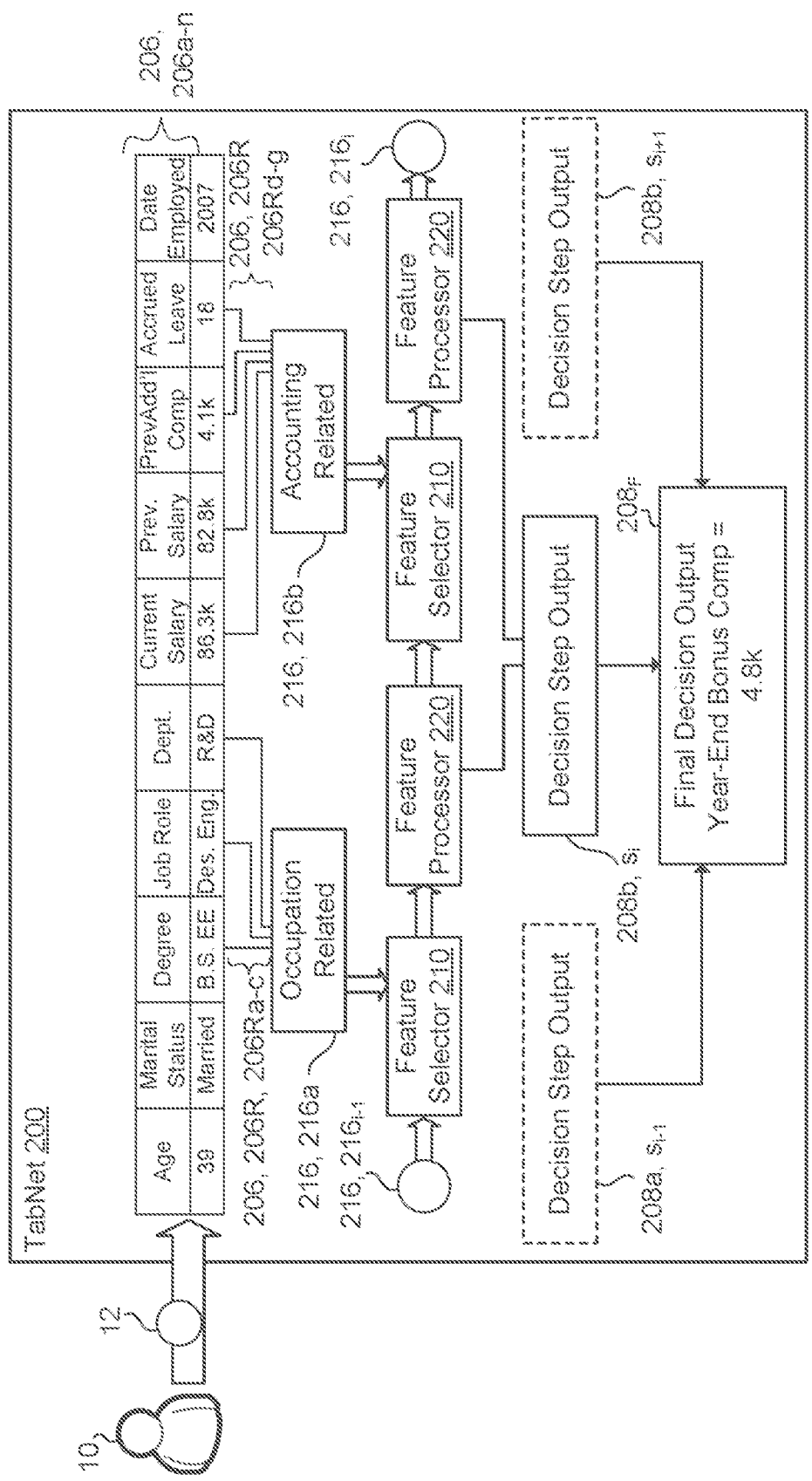
FIGS. 2A-2G are schematic views of example model for interpreting tabular data.

Referring to FIGS. 2A-2G, TabNet 200 generally includes an encoder 202 and a decoder 204. TabNet 200 is configured to receive a set of features 206, 206a-n at the encoder 202, to process a subset 216 of the features 206a-n at each processing decision step S into a decision step output 208, and to aggregate the decision step outputs 208 (i.e., a plurality of processed feature representations) into a final decision output $208_F$. Tabular data refers to data in a table format that generally has a plurality of features 206a-n more commonly referred to as table entries. Generally speaking, the table format includes a series of columns and a number of row entries for each column. Each row entry for a particular column typically relates to a column heading. In other words, a column with a heading (e.g., a categorical heading) of "Salary" will have row entries of numerical values representing salaries. Because a table entry may be numerical or categorical in nature, likewise a feature 206 may refer to a numerical feature 206 or a categorical feature 206. For instance, FIG. 2A depicts the plurality of features 206, 206a-n corresponding to the table of user data 12 where the headings of "Age," "Marital Status," "Degree," "Job Role," Department ("Dept."), "Current Salary," Additional Compensation ("Add'l Comp"), Previous Salary ("Prev. Salary"), "Accrued Leave," and "Date Employed" are categorical features 206 and some of the row entry data corresponding to "Age," "Current Salary," Previous Year Additional Compensation ("PrevAdd'l Comp"), Previous Salary ("Prev. Salary"), "Accrued Leave," and "Date Employed" are numerical features 206. When the feature 206 is a numerical feature 206. TabNet 200 may be configured to use this numerical feature 206 in its raw form. When the feature 206 is a categorical feature 206, TabNet 200 may be configured to map categorical features 206 to trainable embeddings. Here, TabNet 200 does not typically perform global normalization for feature(s) 206, but rather performs batch normalization (BN) during processing (e.g., at the feature transformer 222 and/or at the attentive transformer 212). Each decision step S may receive features 206 of the same dimensional size.

Here, the encoder 202 is capable of performing either classification or regression. The encoder 202 generally includes a feature selector 210 and a feature processor 220 at each decision step S. The encoder 202 performs multi-step processing (e.g., shown in FIG. 2C) with N number of decision steps S. With multiple decision steps S, an input for a current step $S_i$ is processing information from the previous step $S_{i-1}$. For instance, in FIG. 2A, the feature selector 210 is initially accounting for processing information (e.g., regarding the subset 216 of features 206 from the previous step $S_{i-1}$) and the feature processor 220 is generating processing information (e.g., regarding the subset 216 of features 206 for the current step $S_i$). The decision outputs 208 of each decisions step $S_{i-n}$ are then used to generate the final decision output $208_F$. For example, FIG. 2A illustrates decision outputs 208a-c from three steps S forming the final decision output $208_F$.

Feature selection generally refers to the process to choose a reduced number of explanatory variables (e.g., features 206) to describe a response variable (final decision output $208_F$). Feature selection helps prevent issues with overfitting as the process of feature selection ensures that the variables (e.g., features 206) that TabNet 200 decides to process are actually related to the desired decision output. By using feature selection, TabNet 200 also gains interpretability by the fact that a model is generally easier to interpret when one can see the model uses meaningful variables and removes or disregards redundant or meaningless variables. For instance, if TabNet 200 is configured to predict year-end bonus compensations, a feature 206 (or variable) corresponding to an employee's marital status is less important or potentially meaningless when compared to a features 206 such as current salary and job role.

In some examples, the feature selector 210 receives a plurality of features 206 and selects the salient features 206 from the plurality of features 206 that corresponds to the desired decision output to form a subset 216 of relevant features 206R. For instance, in the example of FIG. 2A, if the desired decision output is a prediction of year-end bonus compensation, from a plurality of features 206, the feature selector 210 identifies the relevant features 206R as occupation related features 206 as a first subset 216, 216a of features 206 and accounting related features 206, as a second subset 216, 216b of features 206.

In some implementations, to perform feature selection, the feature selector 210 includes an attentive transformer 212 and a feature mask 214. For instance, the feature mask 214 is a learnable mask for soft selection of salient features 206. In some examples, the feature mask 214 uses sparse selection (referred to as a sparse mask) to select the most salient features 206 (e.g., shown as relevant features 206R, 206Ra-g in FIG. 2A) such that a learning capacity of a decision step S is not wasted on irrelevant features 206. This allows TabNet 200 to become parameter efficient since each feature 206 is meaningfully selected. For instance, the first and second subset 216a-b of "Occupation Related" and "Accounting Related" may meaningfully impact the value of an employee's year-end bonus compensation when compared to other features 206 such as "Age," "Marital Status," or "Date Employed."

Figure 2B:
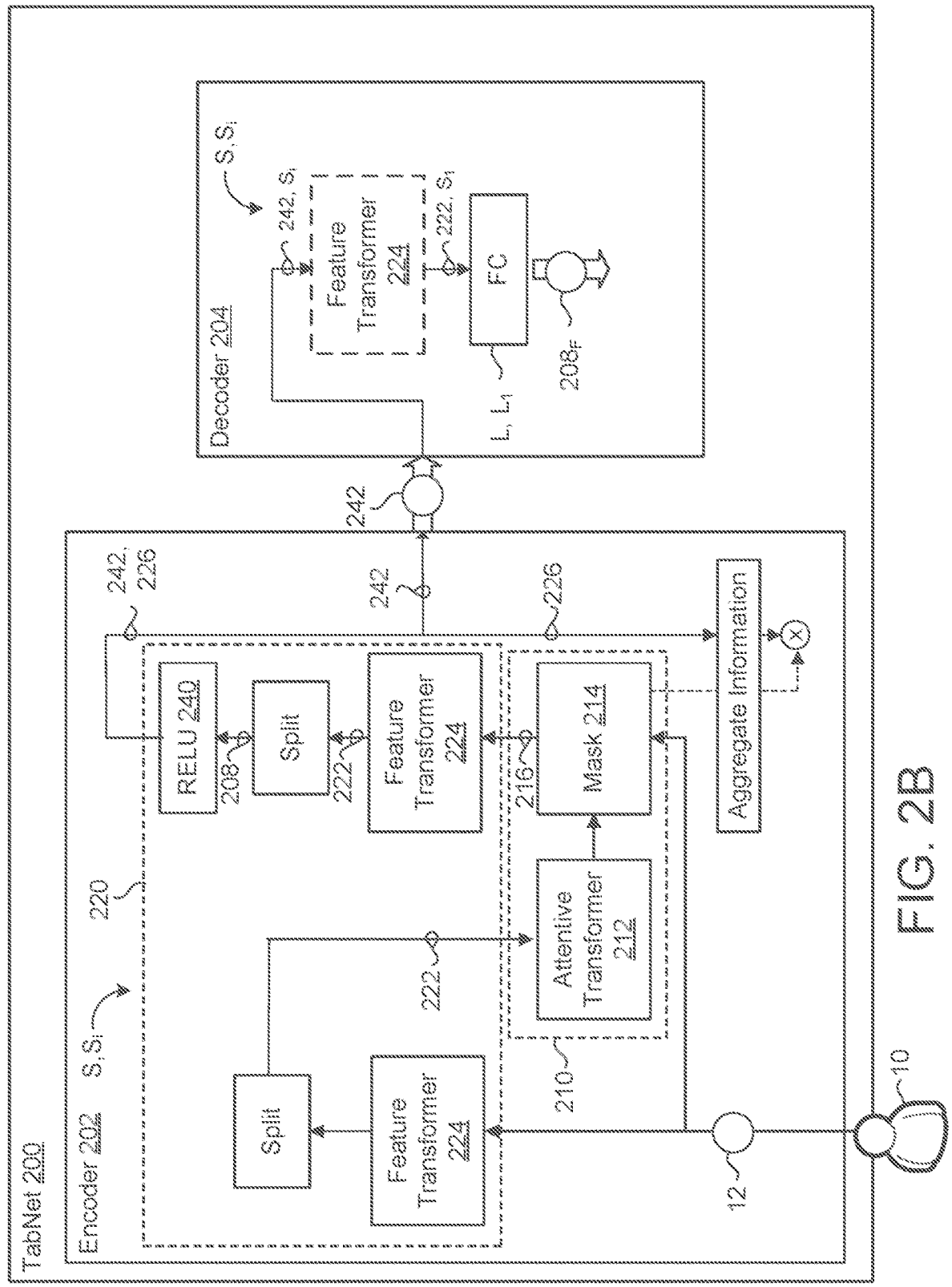
Figure 2C:
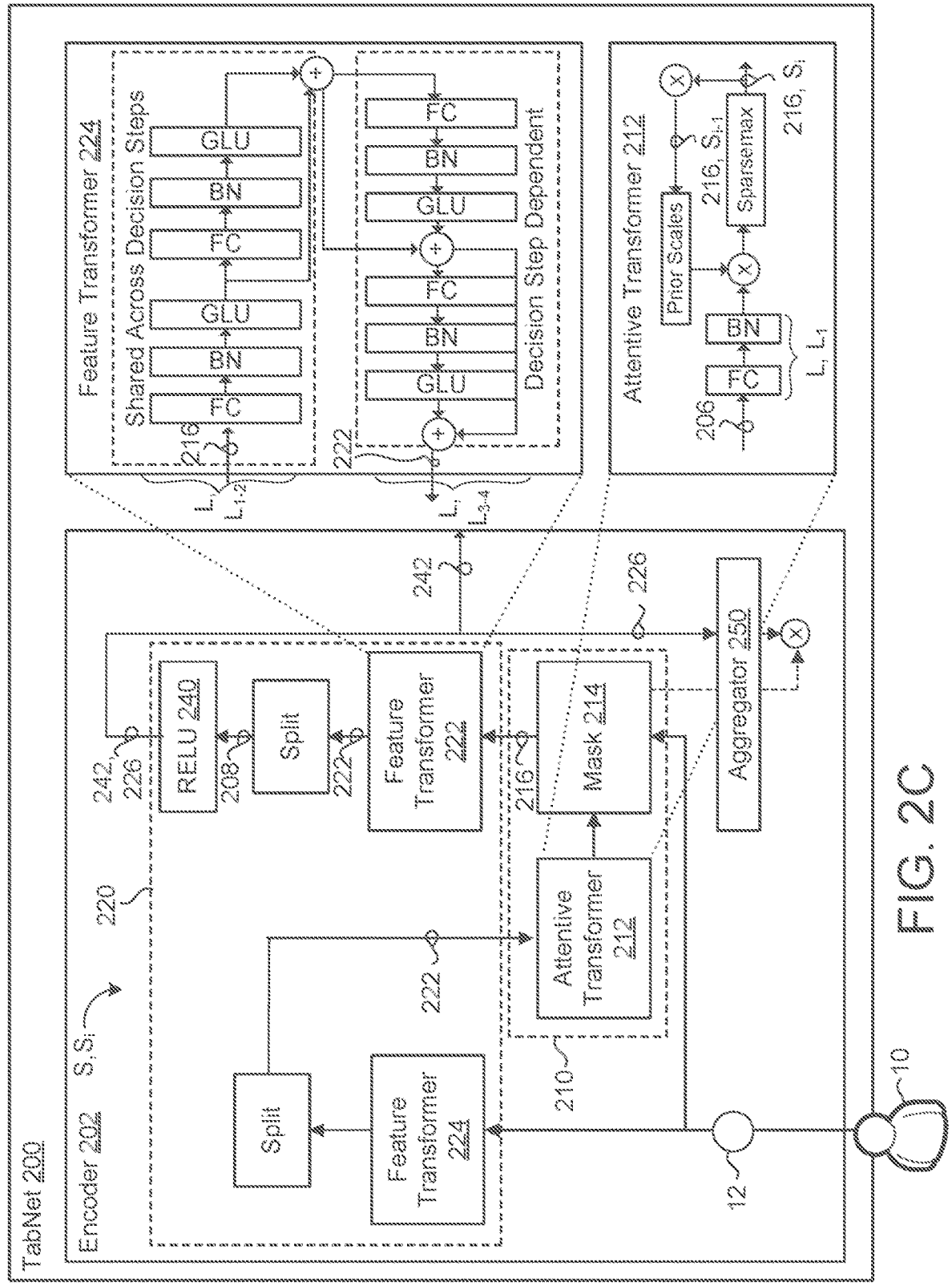

In some configurations, the attentive transformer 212 obtains the mask 214 based on processed features 222 (e.g., from the feature processor 220) from a preceding step $S_{i-1}$. To obtain a sparse mask 214, the attentive transformer 212 may use sparsemax normalization (e.g., as shown in FIG. 2C). Here, sparsemax refers to an activation function that is similar to a traditional activation function such as softmax, but differs in that sparsemax is able to output sparse probabilities (i.e., a small number of non-zero probabilities and a majority of terms with zero probability). For instance, sparsemax generates probabilities for the features 206, but instead of generating non-zero probabilities for all input features 206 (like softmax), sparsemax generates non-zero probabilities for only the relevant features 206R of the subset 216. The remaining or non-relevant features 206 are features 206 that would generally have a small probability that the sparsemax function sets to zero. Accordingly, sparsemax normalization encourages the Euclidean projection onto the probabilistic simplex. Sparsemax normalization allows efficient feature selection performance while having the goal of sparse feature selection for a majority of data sets. For example, the following expression may represent the mask function from the attentive transformer 212:

$$M[i] = \text{sparsemax}(P[i-1] \times h_i(a[i-1])) \quad (1)$$

where P[i−1] is the prior scale term, $h_i$ is a trainable function, and a[i−1] refers to the processed feature 222 from the prior step $S_{i-1}$. P[i] may be represented as follows:

$$P[i] = \Pi_{j=1}^{i}(y - M[j]) \quad (2)$$

where y is a relaxation parameter such that when y=1, a feature 206 is enforced to be used only at one decision step S. Therefore, when y increases, there is more flexibility to use a feature 206 in multiple decision steps S. This allows the attention towards sparsely masked features to be tunable.

In some implementations, as shown by equation (1), the attentive transformer 212 obtains the trainable mask by using a trainable function. For example, the attentive transformer 212 receives the features 206 and processes the features 206 through a single layer L, $L_1$ mapping that is modulated with prior scale information to understand how much attention has been previously focused on particular features 206 in prior decision steps S. In other words, the prior scale determines (e.g., based on aggregation) for all prior steps $S_{i-1}$ how much each feature 206 has been used by the encoder 202 as a relevant feature 206R for feature processing prior to the current decision step $S_i$. In some examples, such as FIG. 2C, the single layer $L_1$ structure of the attentive transformer 212 includes a fully connected layer (FC) performing batch normalization (BN). In some examples, the sparsity of a feature 206 selected for the subset 216 of relevant features 206R may be controlled using sparsity regularization in the form of entropy. For example, the following loss equation may be used to control the sparsity:

$$L_{sparse} = \sum_{i=i}^{Nsteps} \sum_{b=1}^{B} \sum_{j=1}^{D} \frac{-M_{b,j}[i']}{Nsteps \times B} \log(M_{b,j}[i] + \varepsilon) \quad (3)$$

where ε is a small number for numerical stability, B is the batch size, and D is the dimensional size of the features 206. The sparsity realization may then be combined with the overall loss for TabNet 200.

Figure 2D:
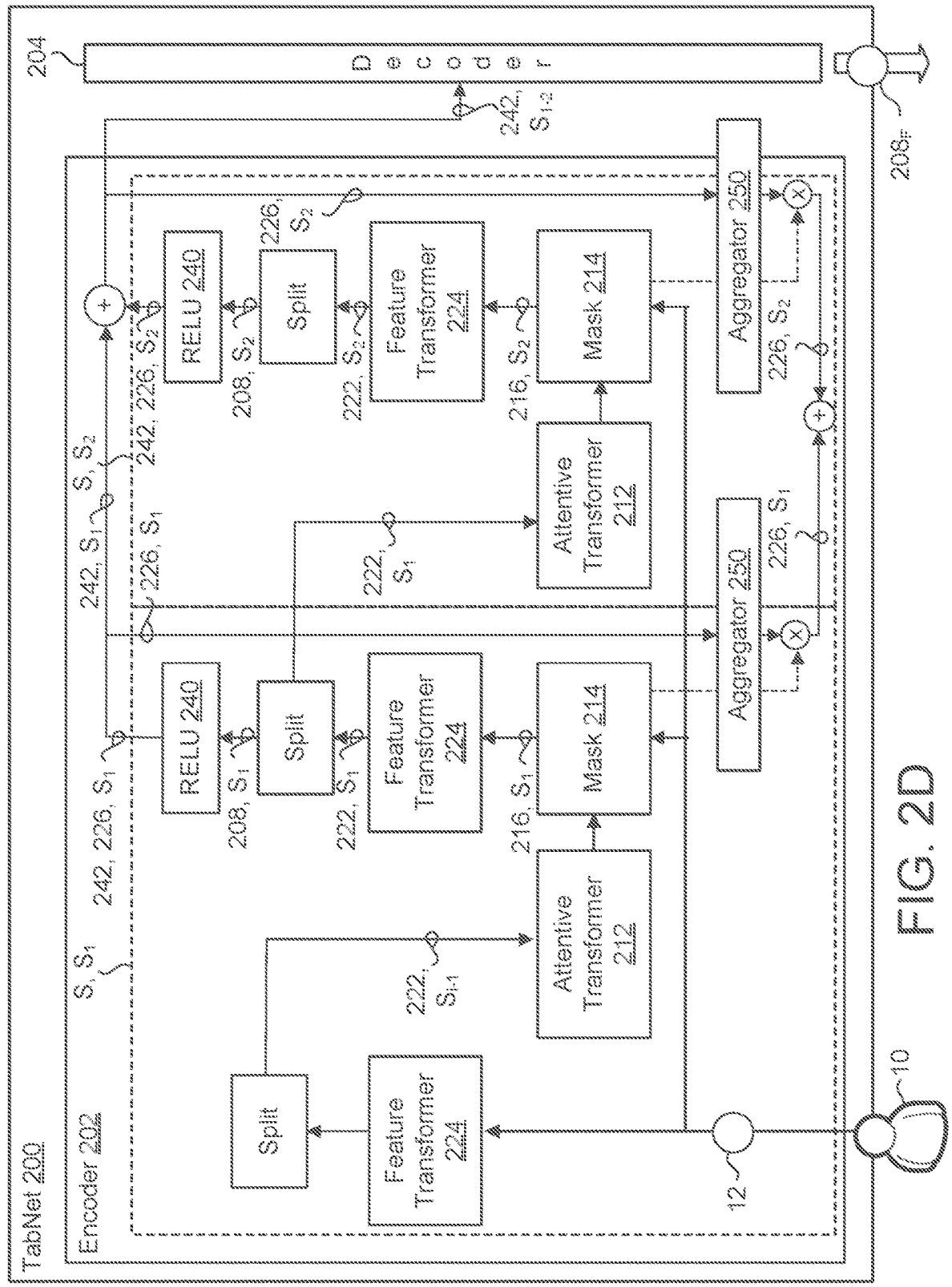

The feature processor 220 is configured to process the filtered features 206 of the subset 216 of features 206 into processed features 222 to form the decision step output 208. Once the feature processor 220 processes the subset 216 of features 206 into processed features 222, the decision step output 208 and information regarding the decision step S, referred to as decision step information 226, is fed into the subsequent decision step Si+1. For instance, FIGS. 2B-2D depict a split following a feature transformer 224 of the feature processor 220. As shown in FIG. 2D, the split feeds a processed feature 222 from a current step $S_i$ (e.g., shown as a first step $S_1$) into the feature selector 210 of the subsequent step $S_{i+1}$ (e.g., shown as a second step $S_2$). For instance, the split feeds the processed feature 222 from the first step $S_1$ into an attentive transformer 212 of the feature selector 210. The attentive transformer 212 may use this processed feature 222, for example, in its prior scale functionality (e.g., shown in FIG. 2C) to determine which features 206 should be selected as the subset 216 of relevant features 206R at the second step $S_2$.

In some examples, to ensure parameter-efficient and robust learning with high capacity, the feature processor 220 includes the feature transformer 224. The feature transformer 224 may include a plurality of processing layers L, $L_{1-n}$. In some implementations, the feature transformer 224 is configured with some layers L (e.g., shown as a first and a second layer L, $L_{1-2}$ in FIG. 2C) that the feature transformer 224 shares across all decision steps $S_{i-N}$ as well as some decision-step dependent layers L (e.g., shown as a third and a fourth layer L, $L_{3-4}$ in FIG. 2C). With shared layers and decision-step dependent layers L, the feature transformer 224 may perform concatenation between the layers L. For instance, FIG. 2C illustrates the two shared layer L, $L_{1-2}$ where each shared L includes a fully-connected layer (FC) followed by batch normalization BN and gated linear unit (GLU) nonlinearity. Here, the feature transformer 224 concatenates each shared layer $L_{1-2}$ together and feeds the concatenation to the decision-step dependent layers $L_{3-4}$. In this example, the feature transformer 224 includes two decision-step dependent layers $L_{3-4}$ where, similar to the shared layers L, the each decision-step dependent layer L includes a fully-connected layer (FC) followed by batch normalization BN and gated linear unit (GLU) nonlinearity. Each decision-step dependent layer $L_{3-4}$ may be concatenated together as well as concatenated with the shared layer $L_{1-2}$. Using these shared decision step layers L and decision-step dependent layers L, the features transformer 224 processes the subset 216 of features 206 (e.g., each relevant feature 206R of the subset 216) into processed features 222.

In some configurations, to determine a decision embedding 242 for each decision step S, the feature processor 220 include a rectified linear unit (RELU) 240. The RELU is a type of activation function that generates a linear relationship between all positive values and zero for all negative values. Here, the RELU 240 functions well for sparse learning because it is sparsely activated (i.e., only activated on positive values). In these configurations, the RELU 240 receives the decision step output 208 for the processed feature(s) 222 and generates an embedding (e.g., the decision step embedding 242) to represent the decision step output 208. For instance, the decision embedding 242 can be constructed as $d_{out} = \sum_{i=1}^{Nsteps} \text{ReLU}(d[i])$, where $N_{steps}$ is the total number of decision steps. In some examples, the REI 240 outputs the decision step embedding 242 from a current step $S_i$ to be combined (e.g., concatenated) with a decision step embedding 242 from subsequent and/or prior decision steps S in order to form an overall decision embedding 242 for all steps S that is communicated to the decoder 204 for decoding the decision embedding(s) 242) into a recognizable feature 206.

In some implementations, the RELU 240 also passes the decision step information 226 to an aggregator 250. Here, the aggregator 250 is configured to receive decision step information 226 from each decision step S. With the decision step information 226, the aggregator 250 may concatenate this information together. In some examples, the aggregator 250 also receives information regarding feature selection 210 (e.g., shown in FIGS. 2C and 2D as a feedback line from the mask 214). Here, the aggregation of decision step information 226 and/or feature selection information may be used for further interpretability into the functionality of TabNet 200 such that TabNet 200 can provide a user 10 or manager 150 with some context as to the final decision $208_F$. In other words, TabNet 200 may inform the user 10 or the manager 150 that the relevant features 206R to predict the year-end bonus compensation were occupation related (e.g., relevant features 206Ra-c) and accounting related (e.g., relevant features 206Rd-g).

Figure 2E:
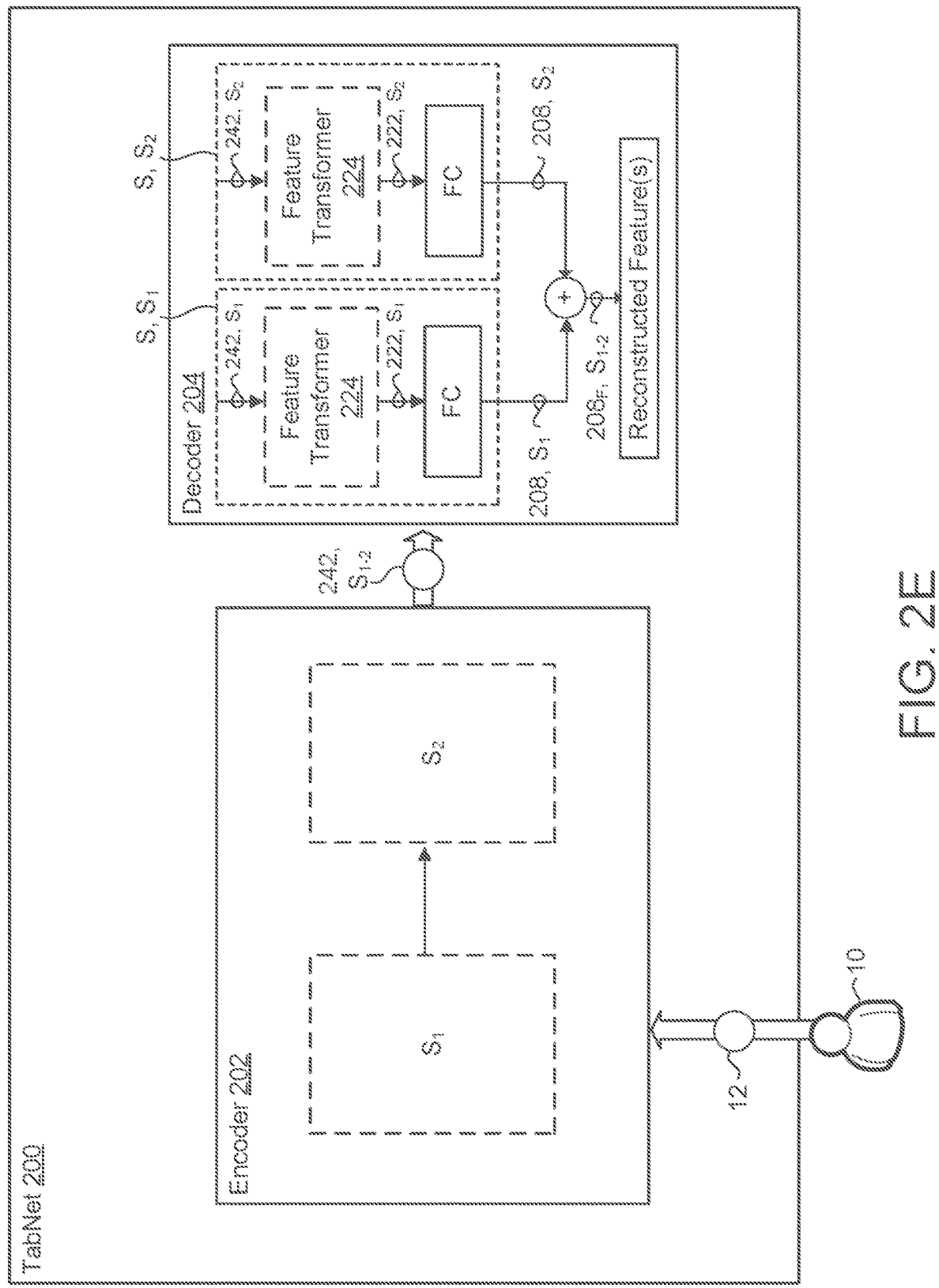
Figure 2F:
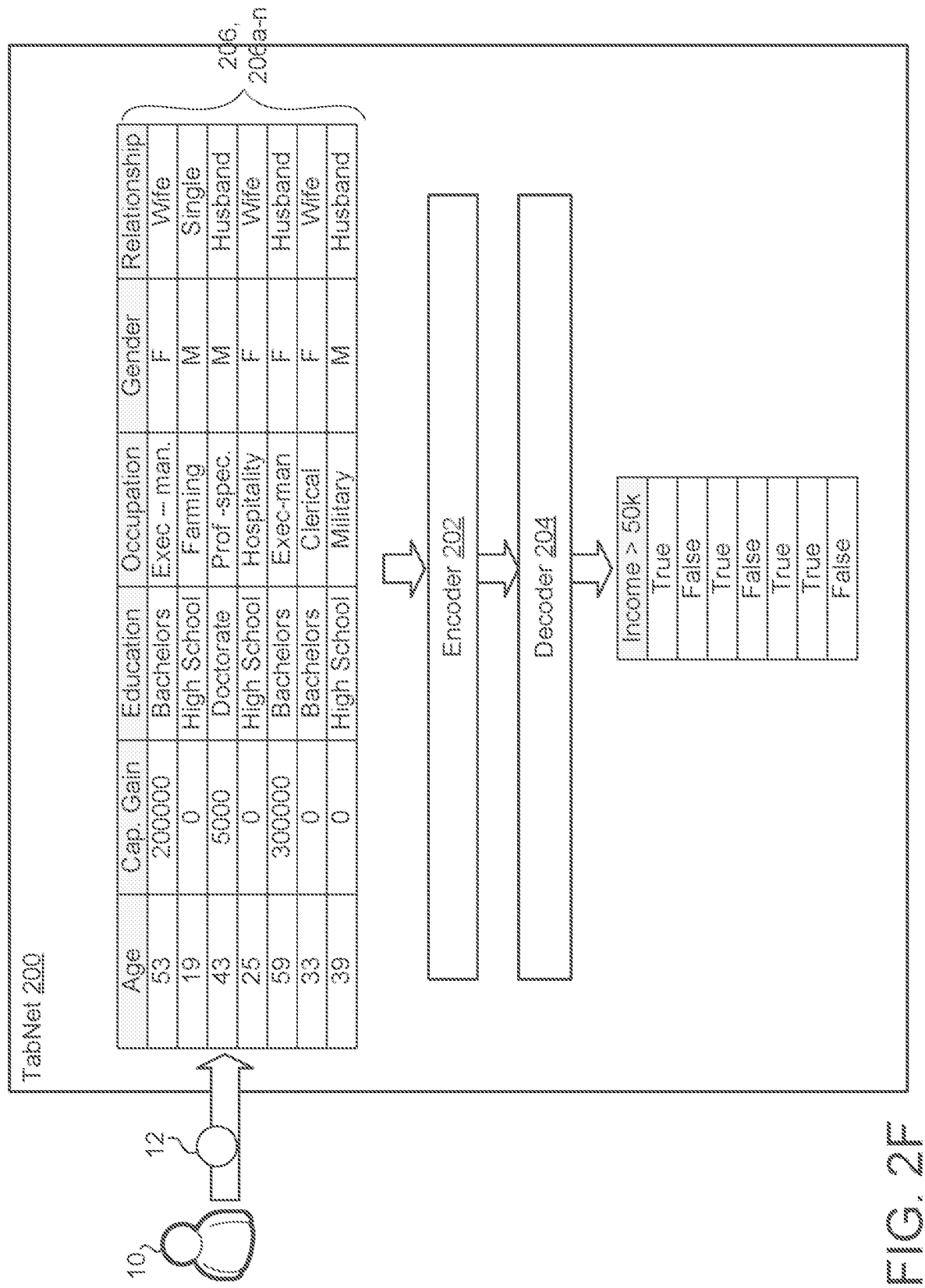

The decoder 204 of TabNet 200 is configured to receive an encoded representation of the decision output 208 and to decode the encoded representation into an interpretable decision output 208. For example, the decoder 204 enables the encoded representation to transform from a computer-readable encoded representation that is efficient for encoder functions into a human-readable decoded representation (i.e., a reconstructed feature) of the decision output 208. Referring to FIGS. 2B, 2C, and 2E, the decoder 204 receives a decision embedding 242 as the encoded representation of the decision output from the encoder 202 and uses a feature transformer 224 to transform the decision embedding 242 into the decision output 208. For instance, the decoder 204 includes one or more feature transformers 224 followed by fully-connected (FC) layers to decode the encoded representation (e.g., the decision embedding 242). In some examples, the encoder 202 communicates the decision embedding 242 at each step S to the decoder 204 such that the decoder 204 is configured to combine each decision step output 208 into the final decision output $208_F$. For example, the decoder 204 may apply a linear mapping to obtain the final decision $208_F$. As a multiple step example, FIG. 2E depicts the encoder 202 concatenating two decision step outputs 208 from a first step $S_1$ and a second step $S_2$ into the final decision output $208_F$.

Figure 2G:
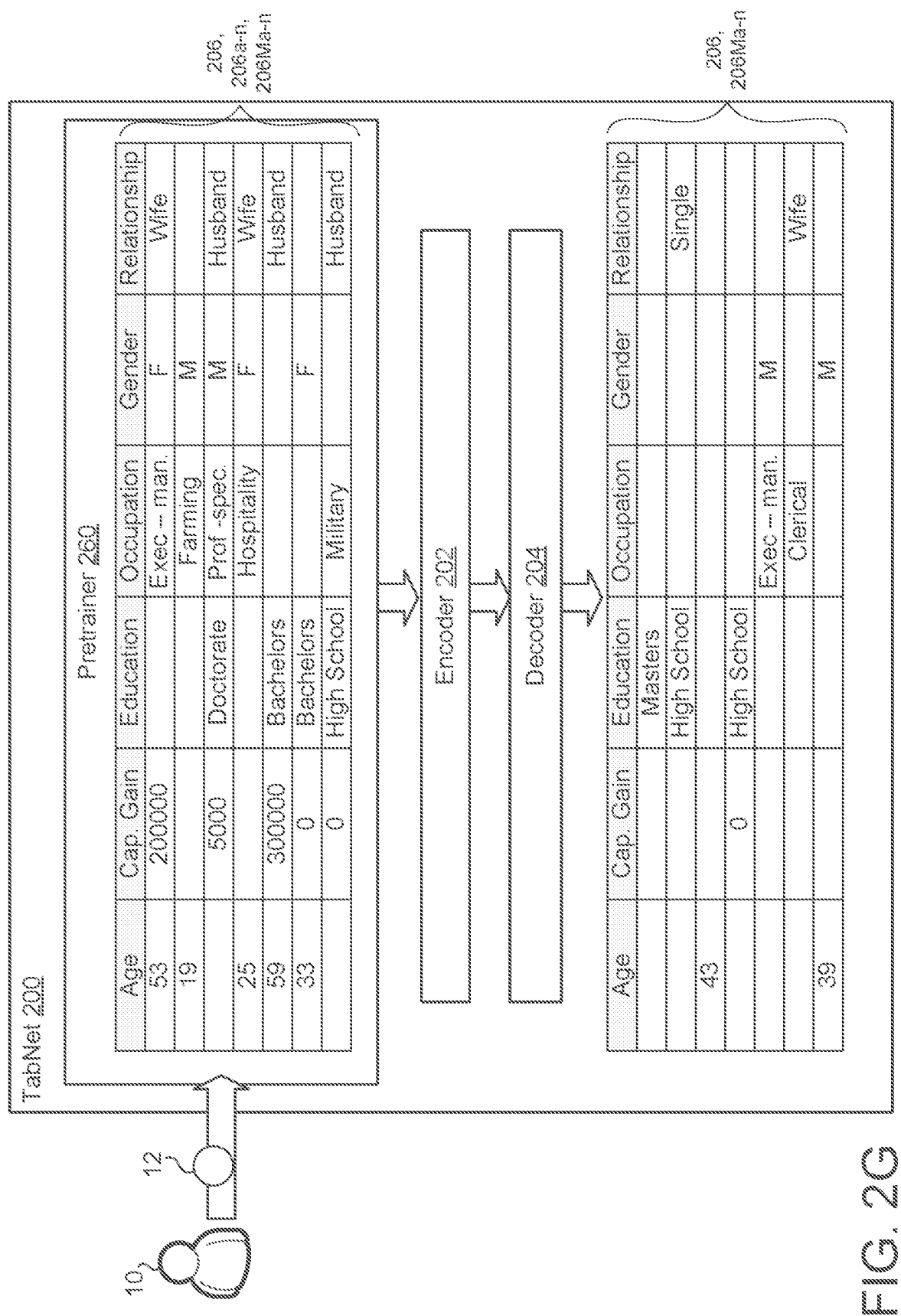

FIG. 2G depicts a real-world example of the functionality of TabNet 200. Here, the user 10 provides user data 12 to TabNet 200 (e.g., via the manager 150). The user data 12 is in a tabular form with features 206 corresponding to age, capital gain, education, occupation, gender, and relationship. Here, the user 10 uses TabNet 200 to predict whether each of the individuals corresponding to each row of data would be predicted to have an annual income of greater than fifty thousand dollars. Although not shown, TabNet 200, prior to inference (i.e., real-time application), would first be trained on a set of training examples with actual income information or ground truth labels that indicate some aspect of income based on a set of features 206. Once a training process trains TabNet 200, TabNet 200 is capable of receiving the user data 12 shown in FIG. 2G with the plurality of features 206 and generating a prediction (e.g., the final decision output $208_F$ of the decoder 204) of whether each individual would have an income exceeding fifty thousand based on what TabNet 200 has learned from the user data 12.

Generally speaking, TabNet 200 performs supervised learning for a particular task. Yet in some examples, performing unsupervised representation learning prior to supervised learning improves the functionality of TabNet 200 for supervised learning the particular task. For instance, TabNet 200 may be used for the task of predicting missing features 206, 206M in tabular data. This may be advantageous because often real-world tabular datasets have interdependent feature columns that TabNet 200 can learn to understand in order to predict a missing feature 206M based on other related features 206 in the same column or related interdependent columns. For example, FIG. 2G depicts the user data 12 as table entries with a number of missing features 206, 206M, 206Ma-n. Here, for a missing entry regarding education level, TabNet 200 may predict the missing feature 206M using related features 206 such as occupation. Similarly, a missing feature 206M for gender may be predicted from other gender entries in combination with relationship entries. To perform unsupervised representation learning, TabNet 200 uses a self-supervised objective with a pretrainer 260. For example, with a binary mask of $S \in \{0, 1\}^{B \times D}$, the encoder 202 of TabNet 200 inputs (1−S)·f and the decoder 204 outputs the reconstructed features S·f. Here, the encoder 202 may initialize the prior scale term to be P[0]=(1−S) so that TabNet 200 emphasizes known features 206 and the decoder's fully-connected layers (FC) is multiplied by S to merely output the unknown or missing features 206M. In unsupervised representation learning, normalization with the population standard deviation of the ground truth data may be important to truncate potentially very different values for the features 206.

Figure 3:
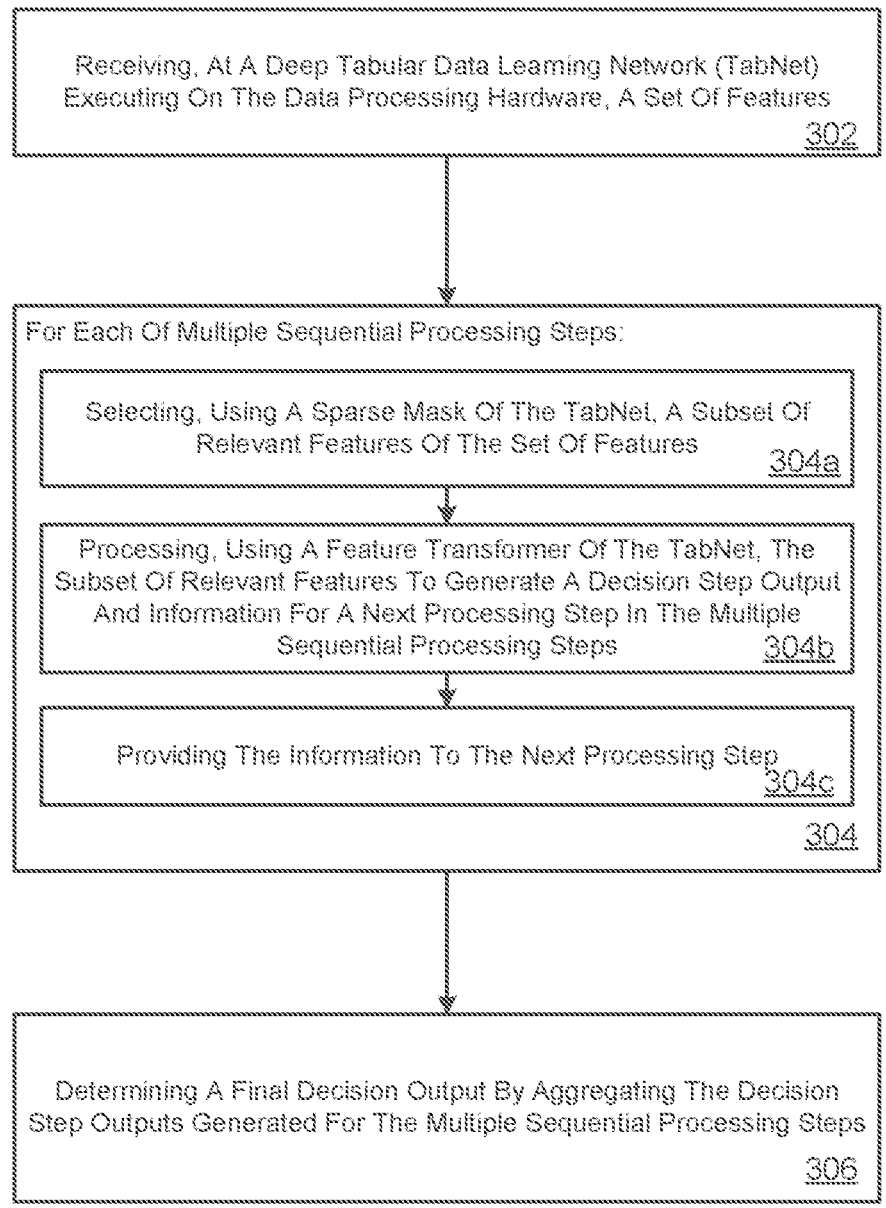
FIG. 3 is a flowchart of an example arrangement of operations for a method of interpreting tabular data.

FIG. 3 is a flowchart of an example arrangement of operations for a method 300 of interpreting tabular data. At operation 302, the method 300 receives, at deep tabular data learning network (TabNet) 200 executing on data processing hardware 132, a set of features 206, 206a-n. At operation 304, the method 300 performs sub-operations 304a-c for each of multiple sequential processing steps S, $S_{i-n}$. At operation 304a, the method 300 selects using a sparse mask 214 of the TabNet 200, a subset of relevant features 216, 216a-n of the set of features 206, 206a-n. At operations 304b, the method 300 processes, using a feature transformer 224 of the TabNet 200, the subset of relevant features 216, 216a-n to generate a decision step output 208 and information 226 for a next processing step S, $S_{i+1}$ in the multiple sequential processing steps S, $S_{i-n}$. At operation 304c, the method 300 provides the information 226 to the next processing step S, $S_{i+1}$. At operation 306, the method 300 determines a final decision output 208, $208_F$ by aggregating the decision step outputs 208, 208a-n generated for the multiple sequential processing steps S, $S_{i-n}$.

Figure 4:
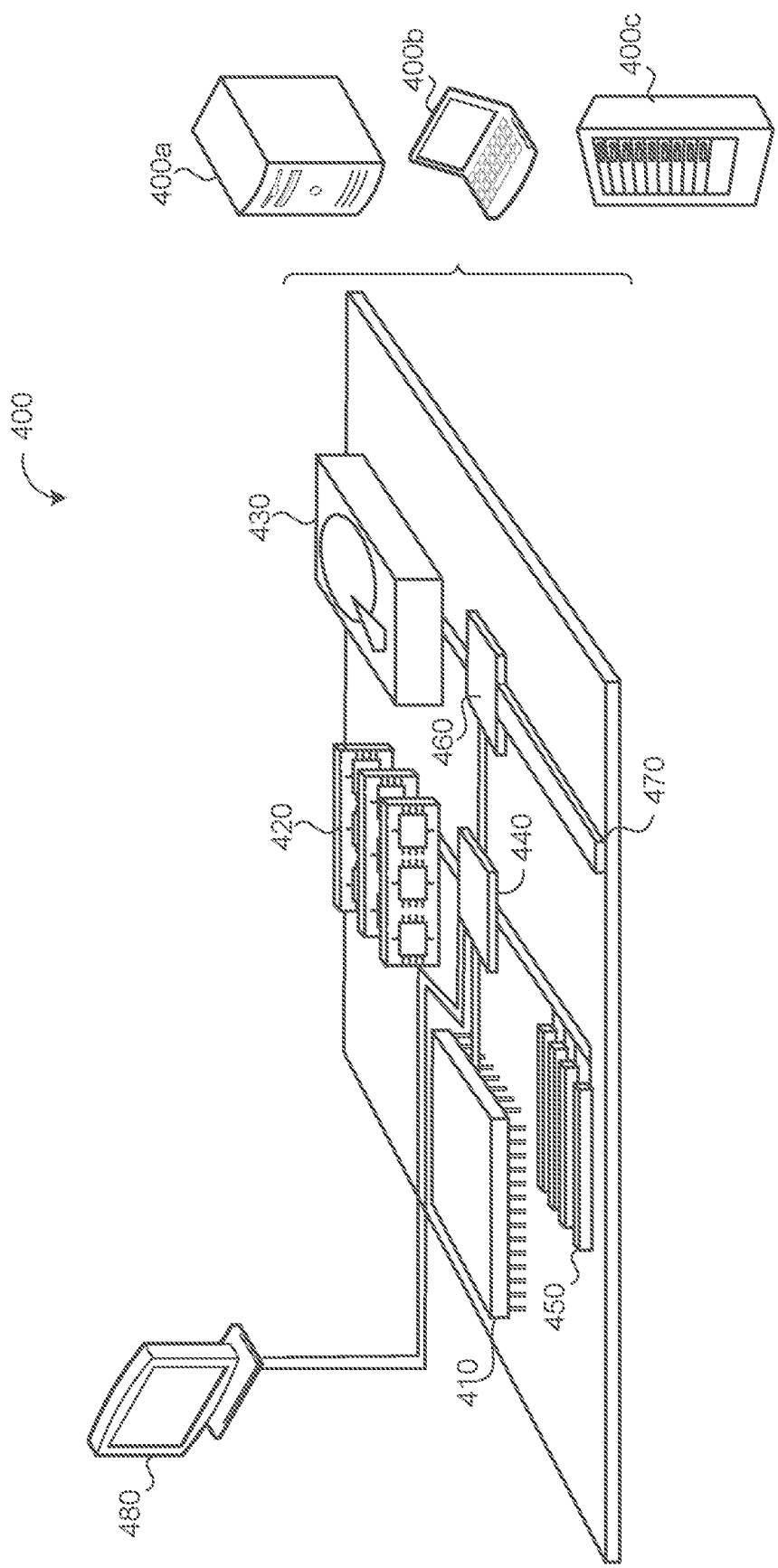
FIG. 4 is a schematic view of an example computing device that may be used to implement the systems and methods described herein.

FIG. 4 is schematic view of an example computing device 400 that may be used to implement the systems (e.g., the manager 150 and/or TabNet 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a users client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at a deep tabular data learning network (TabNet) executing on data processing hardware, tabular data comprising a series of columns, the series of columns comprising a set of features;
for each respective sequential processing step of multiple sequential processing steps:
selecting, by the data processing hardware, using a sparse mask of the TabNet, a subset of relevant features from the set of features based on sparse probabilities and a prior scale, the sparse mask based on an activation function that outputs the sparse probabilities, the prior scale representing an aggregate of how many times each feature from the set of features has been processed prior to the respective sequential processing step;
processing, by the data processing hardware, using a feature transformer of the TabNet, the subset of relevant features to generate a decision step output and information for a next processing step in the multiple sequential processing steps; and providing, by the data processing hardware, the information to the next processing step; and determining, by the data processing hardware, a final decision output by aggregating the decision step outputs generated for the multiple sequential processing steps.

2. The method of claim 1, further comprising, for each respective sequential processing step of the multiple sequential processing steps, determining, by the data processing hardware, using an attentive transformer of the TabNet, the aggregate of how many times each feature from the set of features has been processed prior to the respective sequential processing step.

3. The method of claim 2, wherein the attentive transformer comprises a fully connected layer and batch normalization.

4. The method of claim 1, wherein providing the information to the next processing step comprises providing the information to an attentive transformer of the TabNet that determines, based on provided information, the aggregate of how many times each feature from the set of features has been processed prior to the respective sequential processing step.

5. The method of claim 1, wherein the feature transformer of the TabNet comprises a plurality of neural network layers each including a fully-connected layer, batch normalization, and a generalized linear unit (GLU) nonlinearity.

6. The method of claim 5, wherein a first portion of the plurality of neural network layers are shared across each respective sequential processing step of the multiple sequential processing steps and a remaining second portion of the plurality of neural network layers are dependent on a corresponding sequential processing step of the multiple sequential processing steps.

7. The method of claim 1, wherein the decision step output generated by processing the subset of relevant features passes through a rectified linear unit (ReLU) of the TabNet.

8. The method of claim 1, wherein the subset of features correspond to interdependent feature columns of the tabular data.

9. The method of claim 1, further comprising:
receiving, at the data processing hardware, other tabular data comprising one or more masked features; and
predicting, by the data processing hardware, the one or more masked features using unsupervised pre-training.

10. A system comprising:
data processing hardware; and
memory hardware in communication with the data processing hardware and storing instructions that when executed on the data processing hardware cause the data processing hardware to perform operations comprising:
receiving, at a deep tabular data learning network (TabNet) executing on the data processing hardware, tabular data comprising a series of columns, the series of columns comprising a set of features;
for each respective sequential processing step of multiple sequential processing steps:
selecting using a sparse mask of the TabNet, a subset of relevant features from the set of features based on sparse probabilities and a prior scale, the sparse mask based on an activation function that outputs the sparse probabilities, the prior scale representing an aggregate of how many times each feature from the set of features has been processed prior to the respective sequential processing step;

processing, using a feature transformer of the TabNet, the subset of relevant features to generate a decision step output and information for a next processing step in the multiple sequential processing steps; and providing the information to the next processing step; and determining a final decision output by aggregating the decision step outputs generated for the multiple sequential processing steps.

11. The system of claim 10, wherein the operations further comprise, for each respective sequential processing step of the multiple sequential processing steps, determining, using an attentive transformer of the TabNet, the aggregate of how many times each feature from the set of features has been processed prior to the respective sequential processing step.

12. The system of claim 11, wherein the attentive transformer comprises a fully connected layer and batch normalization.

13. The system of claim 10, wherein providing the information to the next processing step comprises providing the information to an attentive transformer of the TabNet that determines, based on provided information, the aggregate of how many times each feature from the set of features has been processed prior to the respective sequential processing step.

14. The system of claim 10, wherein the feature transformer of the TabNet comprises a plurality of neural network layers each including a fully-connected layer, batch normalization, and a generalized linear unit (GLU) nonlinearity.

15. The system of claim 14, wherein a first portion of the plurality of neural network layers are shared across each respective sequential processing step of the multiple sequential processing steps and a remaining second portion of the plurality of neural network layers are dependent on a corresponding sequential processing step of the multiple sequential processing steps.

16. The system of claim 10, wherein the decision step output generated by processing the subset of relevant features passes through a rectified linear unit (ReLU) of the TabNet.

17. The system of claim 10, wherein the subset of features correspond to interdependent feature columns of the tabular data.

18. The system of claim 10, wherein the operations further comprise:
receiving other tabular data comprising one or more masked features; and
predicting the one or more masked features using unsupervised pre-training.

* * * * *